(12) United States Patent
Hanafusa et al.

(10) Patent No.: US 6,327,799 B1
(45) Date of Patent: Dec. 11, 2001

(54) SNOW-REMOVING MACHINE (75) Inventors: Jitsumi Hanafusa; Tomoki Ito; Seishu Sakai; Takahiro Yamamoto; Masayuki Yamamoto, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/612,295

(22) Filed: Jul. 7, 2000

(30) Foreign Application Priority Data

Jul. 8, 1999 (JP) .................................................. 11-194401
Jul. 9, 1999 (JP) .................................................. 11-195728

(51) Int. Cl.$^7$ .................................................. E01H 5/09
(52) U.S. Cl. .................................................. 37/257
(58) Field of Search .................................. 37/242, 244, 245, 37/248, 249, 254, 257, 258, 222, 223, 232; 188/313, 314, 315, 316, 317; 267/64.26

(56) References Cited

U.S. PATENT DOCUMENTS

| 4,756,101 | * | 7/1988 | Friberg et al. . |
| 4,783,915 | * | 11/1988 | Sasaki et al. . |
| 5,921,010 | * | 7/1999 | Schulte et al. . |
| 6,131,316 | * | 10/2000 | Yoshina et al. . |

FOREIGN PATENT DOCUMENTS

| 61-23059 | | 7/1986 | (JP) . |
| 1-198910 | * | 8/1989 | (JP) . |
| 11-29914 | * | 2/1999 | (JP) . |
| 11-200330 | * | 7/1999 | (JP) . |
| 2000-144666 | * | 5/2000 | (JP) . |
| 2000-290951 | * | 10/2000 | (JP) . |

* cited by examiner

Primary Examiner—Victor Batson
(74) Attorney, Agent, or Firm—Arent Fox Kintner Plotkin & Kahn, PLLC (57) ABSTRACT

In a snow-removing machine, an expandable and contractible regulating mechanism is coupled between a steering handlebar of a machine body including a snow-removing section and a drive section capable of being turned relative to the machine body about a wheel driving shaft, and is capable of regulating the level of the snow-removing section relative to the drive section. The expandable and contractible regulating mechanism is comprised of a cylinder connected to the machine body, a piston which divides the inside of the cylinder into a first chamber and a second chamber, a piston rod coupled to the piston and connected to the drive section, a communication passage permitting communication between the first and second chambers, and an on-off valve for opening and closing the communication passage. A high-pressure gas is filled in the first and second chambers, so that the expansion and compression of the high-pressure gas is permitted upon closing of the on-off valve. Thus, during a snow-removing operation of the snow-removing machine, vibration applied to the drive section can be absorbed utilizing the expandable and contractible regulating mechanism for regulating the level of the snow-removing section.

5 Claims, 10 Drawing Sheets

SNOW-REMOVING MACHINE

BACKGROUND OF THE INVENTION

1. Field of the Invention

The present invention relates to an improvement in a snow-removing machine comprising a machine body having a snow-removing section mounted at a front portion thereof, a steering handlebar mounted at a rear portion thereof and a power unit mounted at an intermediate portion thereof. A drive section has driven wheels driven by a wheel driving shaft of the power unit and can be turned relative to the machine body about the wheel driving shaft. An expandable and contractible regulating mechanism is coupled between the machine body and the drive section and is capable of regulating the level of the snow-removing section relative to the drive section. The expandable and contractible regulating mechanism is comprised of a cylinder connected to one of the machine body and the drive section, a piston which is slidably received in the cylinder and which divides the inside of the cylinder into a first chamber and a second chamber, a piston rod which is coupled to the piston, passes through the second chamber and is connected to the other of the machine body and the drive section, a communication passage permitting the communication between the first and second chambers, and an on-off valve capable of opening and closing the communication passage as desired.

2 Description of the Prior Art

A snow-removing machine is already known, for example, as disclosed in Japanese Utility Model Registration Publication No. 61-23059.

In such known snow-removing machine, oil is filled in first and second chambers in an expandable and contractible regulating mechanism to flow through a communication passage. To regulate the level of the snow-removing section, an on-off valve is opened, thereby permitting the oil to flow between the first and second chambers to expand or contract the expandable and contractible regulating mechanism. After the regulation of the level of the snow-removing section, the on-off valve is closed to inhibit the flow of oil, thereby hydraulically locking the expandable and contractible regulating mechanism.

However, when the expandable and contractible regulating mechanism is locked hydraulically, the machine body and the drive section are brought into rigidly connected states, whereby a vertical vibration applied to the drive section is transmitted directly to the steering handlebar grasped by an operator during the removal of snow. This causes fatigue of the operator to be hastened.

SUMMARY OF THE INVENTION

Accordingly, it is an object of the present invention to provide a snow-removing machine, wherein the vibration applied to the drive section can be absorbed utilizing the expandable and contractible regulating mechanism for regulating the level of the snow-removing section during removal of snow, thereby easily alleviating the fatigue of the operator.

To achieve the above object, according to the present invention, there is provided a snow-removing machine comprising a machine body having a snow-removing section mounted at a front portion thereof, a steering handlebar mounted at a rear portion thereof and a power unit mounted at an intermediate portion thereof. A drive section has driven wheels driven by a wheel driving shaft of the power unit and can be turned relative to the machine body about the wheel driving shaft, and an expandable and contractible regulating mechanism is coupled between the machine body and the drive section and is capable of regulating the level of the snow-removing section relative to the drive section. The expandable and contractible regulating mechanism is comprised of a cylinder connected to one of the machine body and the drive section, a piston slidably received in the cylinder which divides the inside of the cylinder into a first chamber and a second chamber, a piston rod coupled to the piston, passing through the second chamber and connected to the other of the machine body and the drive section, a communication passage permitting the communication between the first and second chambers, and an on-off valve capable of opening and closing the communication passage as desired, wherein a first end face of the piston facing the first chamber is wider than a second end face of the piston facing the second chamber. A high-pressure gas is filled in the first and second chambers, such that the high-pressure gas is permitted to flow through the communication passage upon opening of the on-off valve to enable the expansion and contraction of the cylinder and the piston rod relative to each other, and the flow of the high-pressure gas through the communication passage is inhibited upon closing of the on-off valve, whereby the expansion and compression of the high-pressure gas in the first and second chambers are permitted.

With this first feature of the present invention, when the on-off valve is opened, the flow of high-pressure gas between the fist and second chambers is permitted. Therefore, the machine body can be turned about the wheel driving shaft, while expanding and contracting the cylinder and the piston rod relative to each other, thereby regulating the level of the snow-removing section. When the on-off valve is closed after the regulation, the flow of high-pressure gas between the fist and second chambers is inhibited and hence, the snow-removing section is maintained at a given level. Moreover, the high-pressure gas in the first and second chambers, which are isolated from each other, is capable of being expanded and compressed and hence, when a vertical vibration is applied to the drive section during a snow-removing operation, the high-pressure gas in the first and second chambers can be expanded and compressed to moderately expand and contract the cylinder and the piston rod relative to each other, i.e., exhibit a damper function to absorb the vibration, thereby reducing the transmission of the vibration to the steering handlebar to alleviate the fatigue of the operator. Therefore, an exclusive damper for absorbing the vibration is not required, which contributes to the simplification of the structure.

According to a second aspect and feature of the present invention, in addition to the first feature of the invention, the center of gravity of the machine body is located to the rear of the wheel driving shaft, and the expandable and contractible regulating mechanism is coupled between the machine body and the drive section at a position rearwardly of the wheel driving shaft, such that a moment provided around the wheel driving shaft by the weight of the machine body is substantially balanced with a moment provided around the wheel driving shaft of the machine body due to the difference between thrusts exerted to the first and second end faces by the high-pressure gas.

With the second feature, when the on-off valve is opened, the machine body can be turned by a relatively small lifting and lowering force applied to the steering handlebar under the substantial balance of the two moments applied to the machine body, thereby easily regulating the level of the snow-removing section.

According to a third aspect and feature of the present invention, in addition to the first or second feature, the expandable and contractible regulating mechanism is positioned, such that the second chamber is located below the first chamber, and the cylinder includes a slide bearing and an oil seal which are provided at a lower end thereof, and through which the piston rod is slidably passed, oil being stored in a bottom of the second chamber with its surface being in contact with the high-pressure gas.

With the third feature, it is possible to lubricate the slide bearing and the oil seal by the oil stored in the bottom of the second chamber to smooth the operation of the piston rod, and to effectively inhibit the leakage of the high-pressure gas from the slide bearing and the oil seal. Therefore, it is possible to maintain the expanding function and the damper function of the expandable and contractible regulating mechanism over a long period.

According to a fourth aspect and feature of the present invention, there is provided a snow-removing machine comprising a machine body having a snow-removing section mounted at a front portion thereof, a steering handlebar mounted at a rear portion thereof and a power unit mounted at an intermediate portion thereof. A drive section which is comprised of a pair of left and right driven wheels is connected to opposite ends of a wheel driving shaft of the power unit, a rear axle supported at rear ends of a pair of left and right drive frames which are relatively turnably is connected to opposite ends of the wheel driving shaft and extends rearwards, a pair of left and right follower wheels are supported at opposite ends of the rear axle, and crawlers are each reeved around the driving and follower wheels on the same side. An expandable and contractible regulating mechanism is coupled between the machine body and the drive section for regulating the level of the snow-removing section, wherein rear ends of the pair of left and right drive frames are connected to each other by a cross member, such that the independent swinging movement of each of the drive frames is permitted about the wheel driving shaft. The expandable and contractible regulating mechanism is coupled between the cross member and the machine body, with a high-pressure gas being filled in a cylinder of the expandable and contractible regulating mechanism to provide a damper function to the expandable and contractible regulating mechanism.

With the fourth feature, the left and right drive frames can be vertically swung independently of each other about the wheel driving shaft. Therefore, when one of the crawlers receives a push-up force from a road surface during removal of snow, only the drive frame on the same side as such one crawler is swung upwards about the wheel driving shaft, and the shock of such swinging movement is absorbed by the damper function of the expandable and contractible regulating mechanism. Thus, it is avoided that the push-up force applied to the one crawler influences the other crawler and the snow-removing section, and thus, it is possible to stabilize the driving performance of the crawlers and the snow-removing performance of the snow-removing section. Moreover, the expandable and contractible regulating mechanism has the damper function applied thereto and hence, a special damper device is not required, which can contribute to the simplification of the arrangement.

According to a fifth aspect and feature of the present invention, the expandable and contractible regulating mechanism is oscillatably connected at the upper and lower opposite ends thereof to the machine body and the cross member, respectively.

With the fifth feature, when the cross member is being swung with the relatively winging movement of the drive frames, it is possible to prevent a side thrust from being applied to the expandable and contractible regulating mechanism by the oscillating action of the upper and lower opposite ends of the expandable and contractible regulating mechanism connected to the machine body and the cross member, thereby ensuring a smooth operation and the durability of the expandable and contractible regulating mechanism.

The above and other objects, features and advantages of the invention will become apparent from the following description of the preferred embodiment taken in conjunction with the accompanying drawings.

DESCRIPTION OF THE PREFERRED EMBODIMENTS

First, a first embodiment of the present invention will be described. Referring to FIGS. 1 to 4, an auger-type snow-removing machine 1 has a machine body 2 which is comprised of a box-shaped machine frame 3, a power unit 4 mounted at a central portion of the machine frame 3, a snow-removing section 5 mounted on a front wall of the machine frame 3, and a steering handlebar 6 mounted at a rear portion of the machine frame 3 to extend rearwards. The power unit 4 is comprised of an engine 7 having a crankcase 7a secured to an upper wall of the machine frame 3, a transmission 8 having a transmission case 8a secured to the front wall of the machine frame 3, and a speed reducer 9 having a reduction case 9a secured to one sidewall of the machine frame 3.

The engine 7 has a crankshaft 10 extending forwards from the crankcase 7a, and first and second driving pulleys 14 and 15 are secured to the crankshaft 10. A first belt 16 is reeved around the first driving pulley 11 and a first follower pulley 14 secured to an input shaft 13a of the transmission 8. The transmission 8 has an output shaft 13b connected to an input gear (not shown) of the speed reducer 9 which has an output gear 18 connected to a wheel driving shaft 21 supported on the transmission case 8a and the machine frame 3 through bearings 19 and 20. Therefore, the power of the engine 7 is transmitted through the transmission 8 and the speed reducer 9 to the wheel driving shaft 21 to drive the wheel driving shaft 21.

The snow-removing section 5 is of a known type including an auger 24, a throw-out duct 25, and an impeller 26 for throwing snow raked together by the auger 24 into the throw-out duct 25. A second follower pulley 15 is secured to a rear end of a driving shaft 27 connected to the auger 24 and the impeller 26, and a second belt 17 is reeved around the second follower pulley 15 and the second driving pulley 12. Therefore, the power of the engine 7 is transmitted through the second belt 17 and the driving shaft 27 to the impeller 26 and the auger 24 to drive the impeller 26 and the auger 24.

Figure 1:
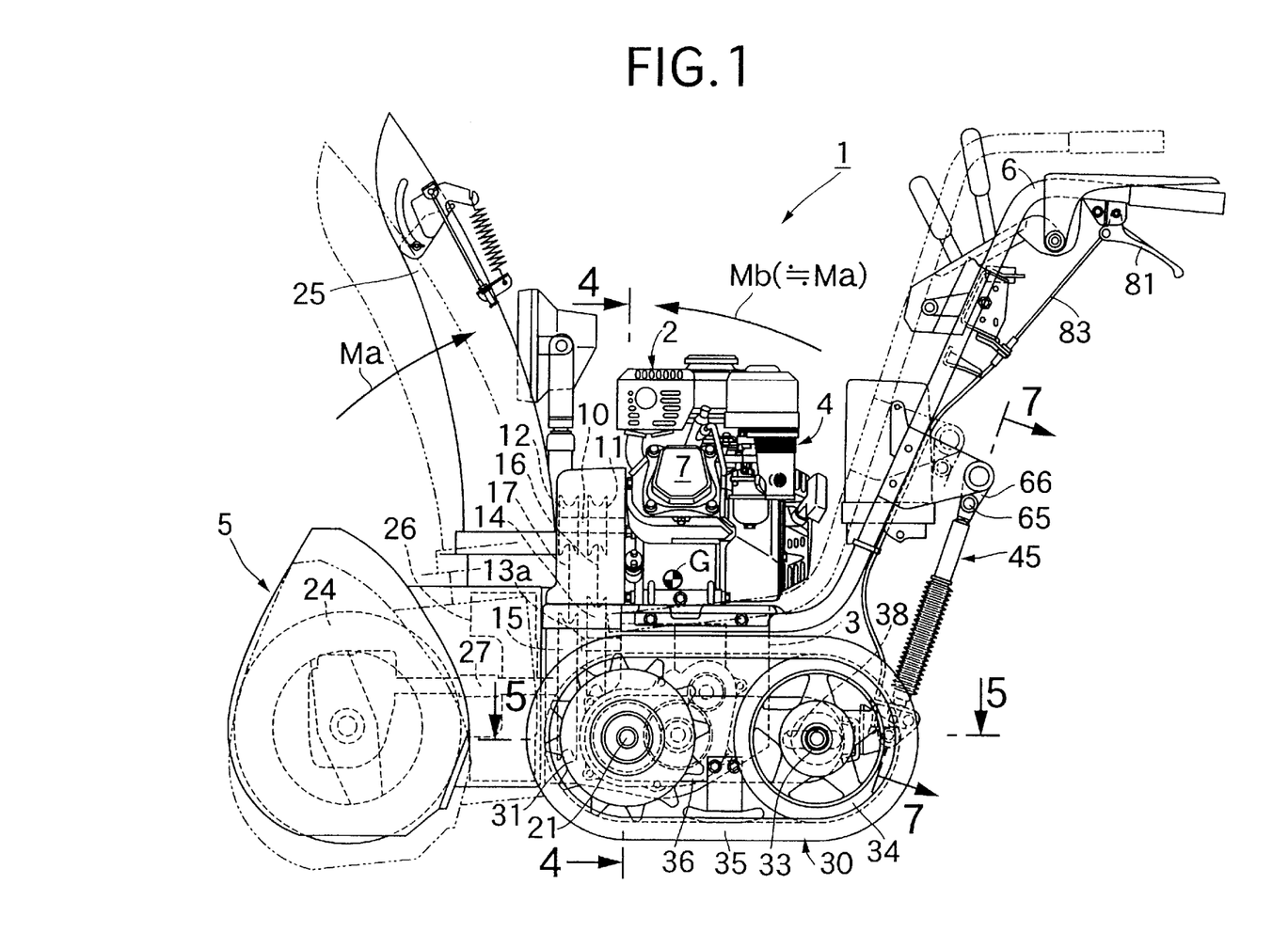
FIG. 1 is a side view of an auger-type snow-removing machine according to a first embodiment of the present invention.
Figure 2:
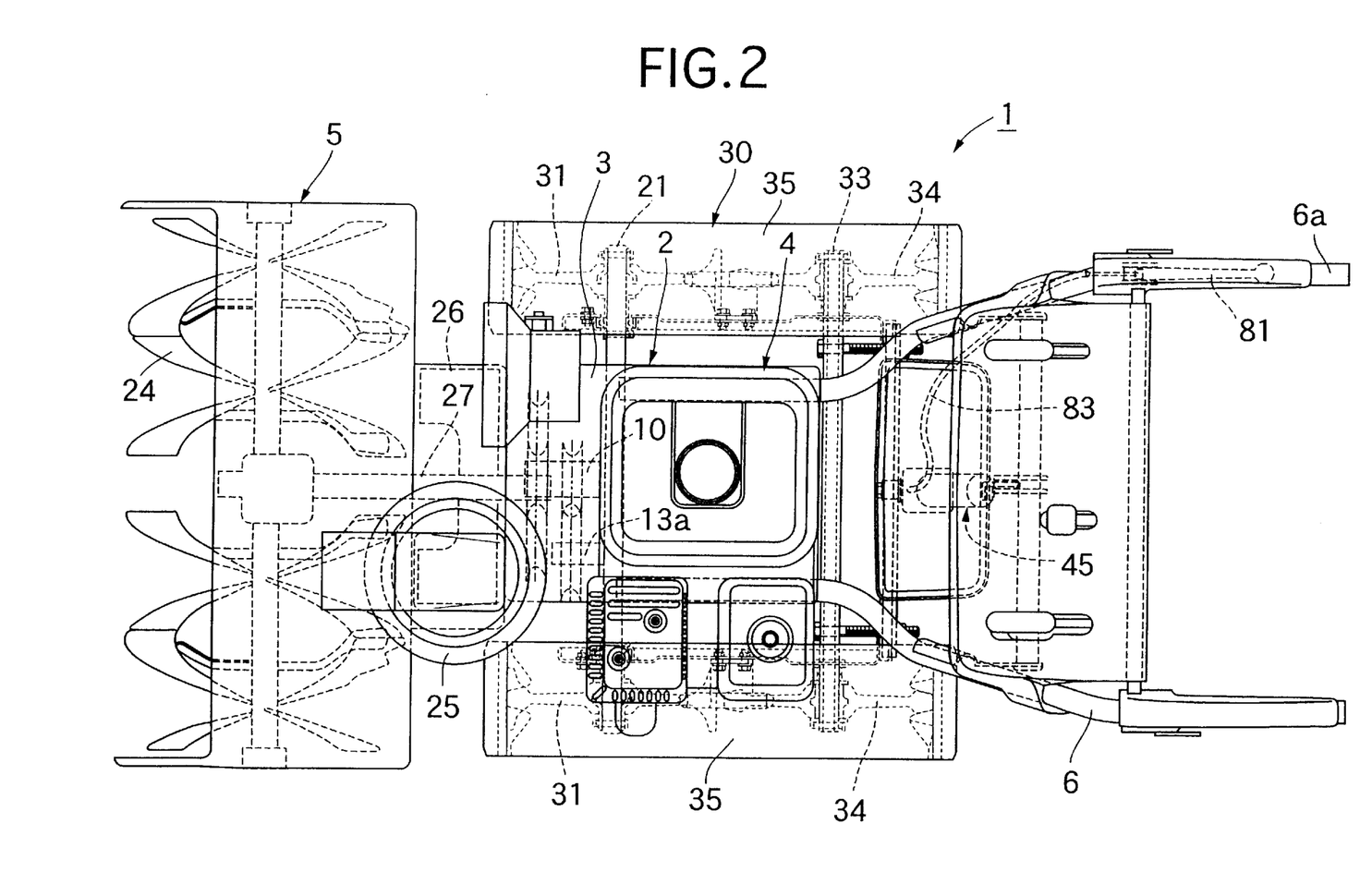
FIG. 2 is a plan view of the snow-removing machine.
Figure 3:
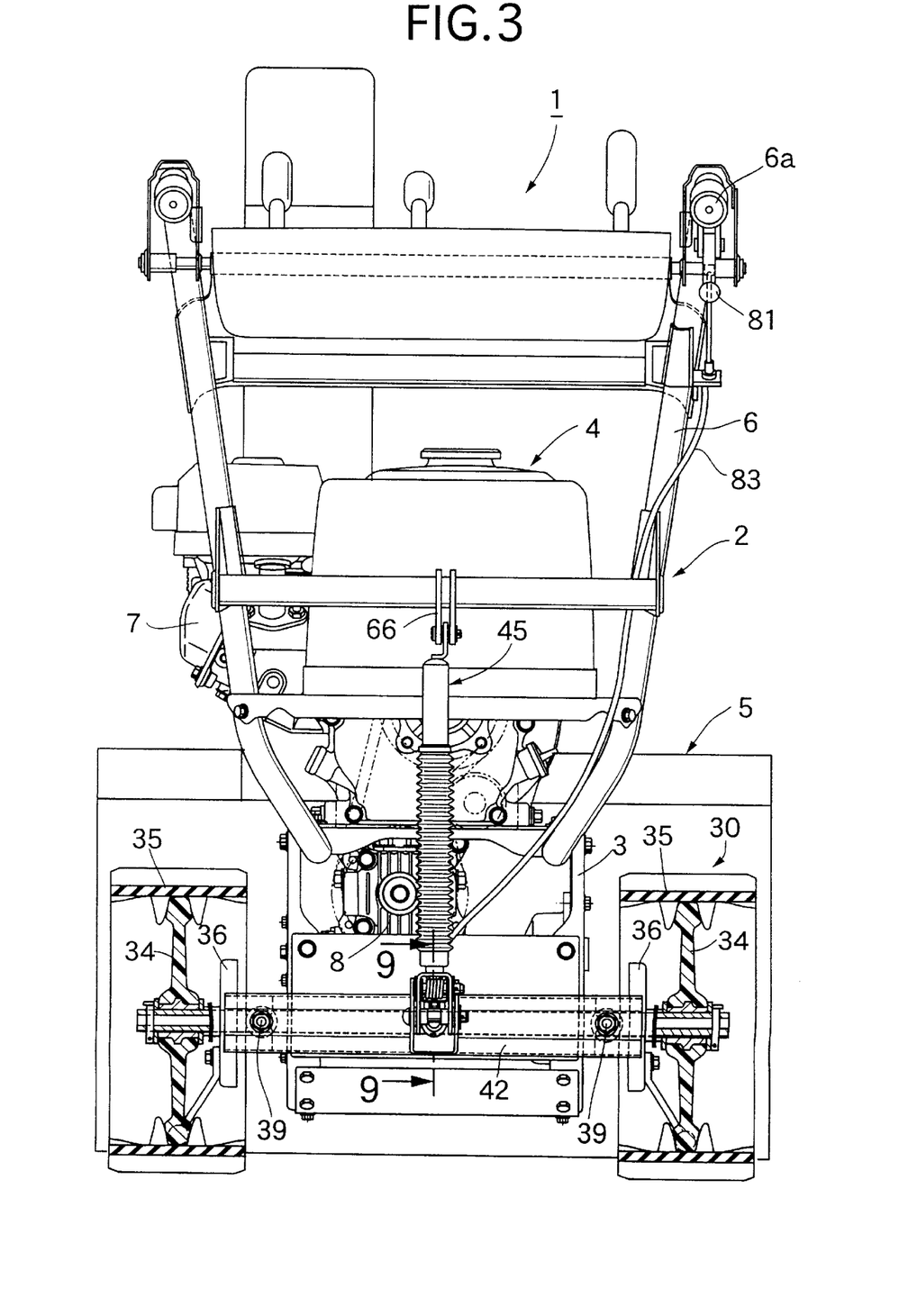
FIG. 3 is a back view of the snow-removing machine.
Figure 4:
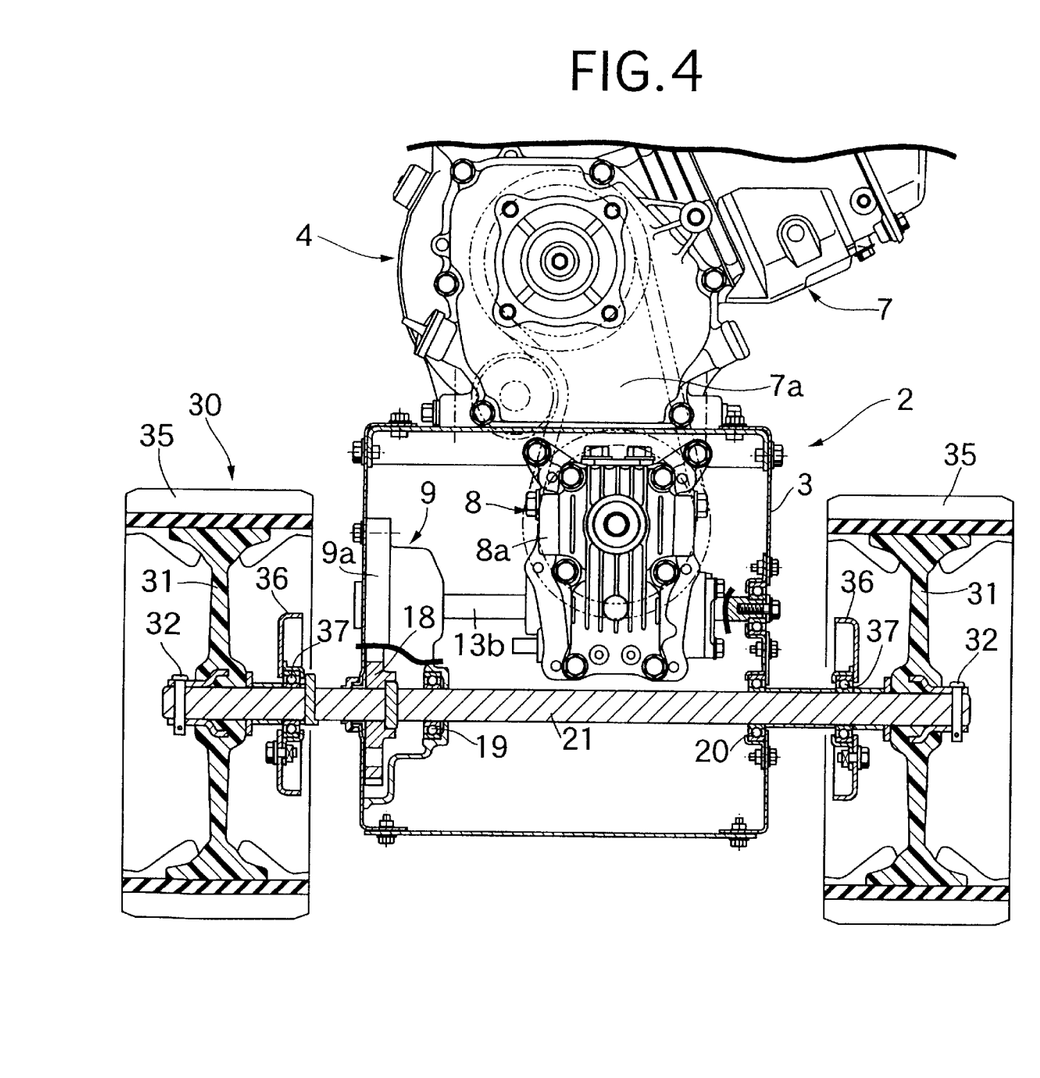
FIG. 4 is a sectional view taken along a line 4—4 in FIG. 1.
Figure 5:
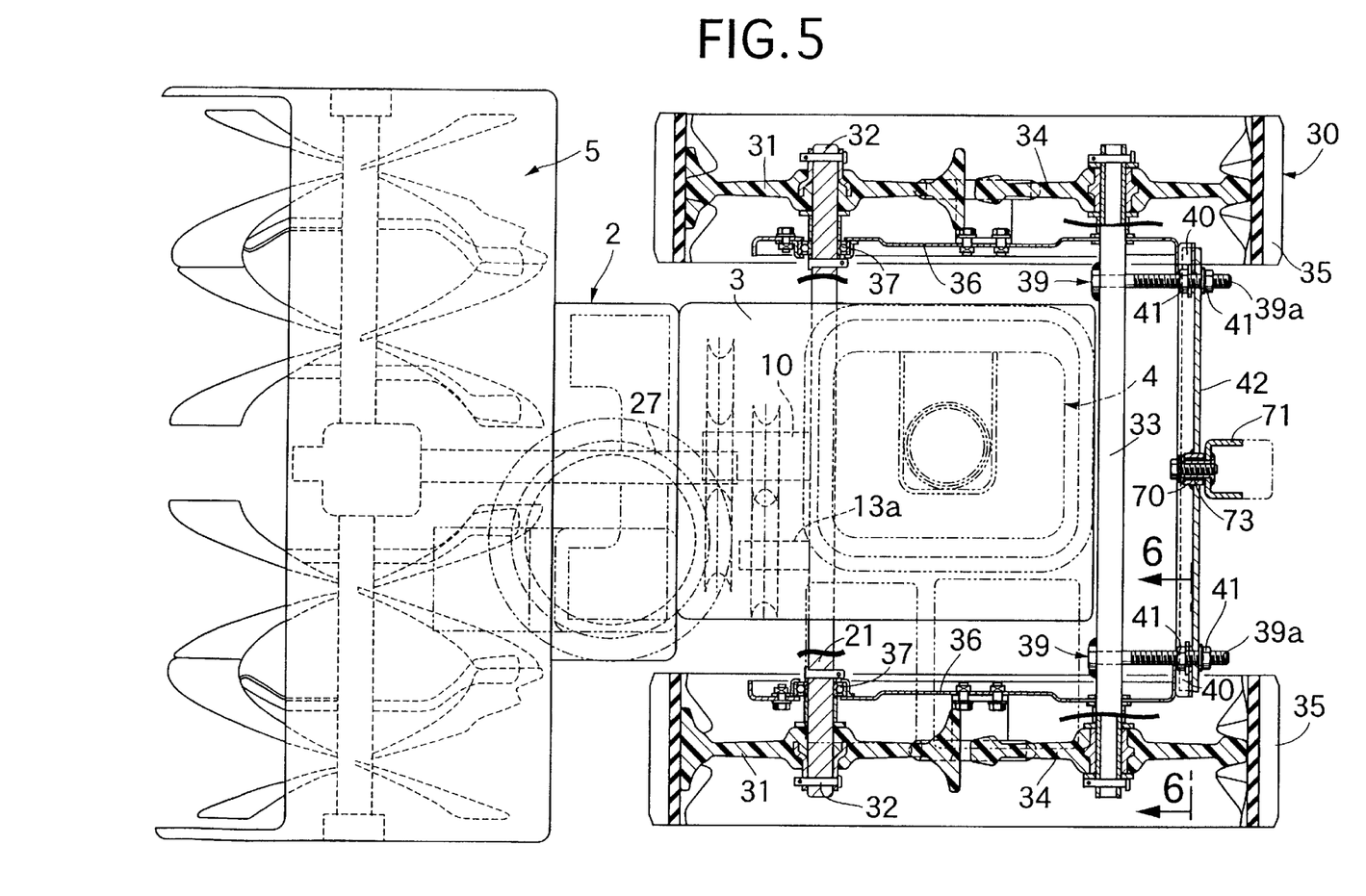
FIG. 5 is a sectional view taken along a line 5—5 in FIG. 1.
Figure 6:
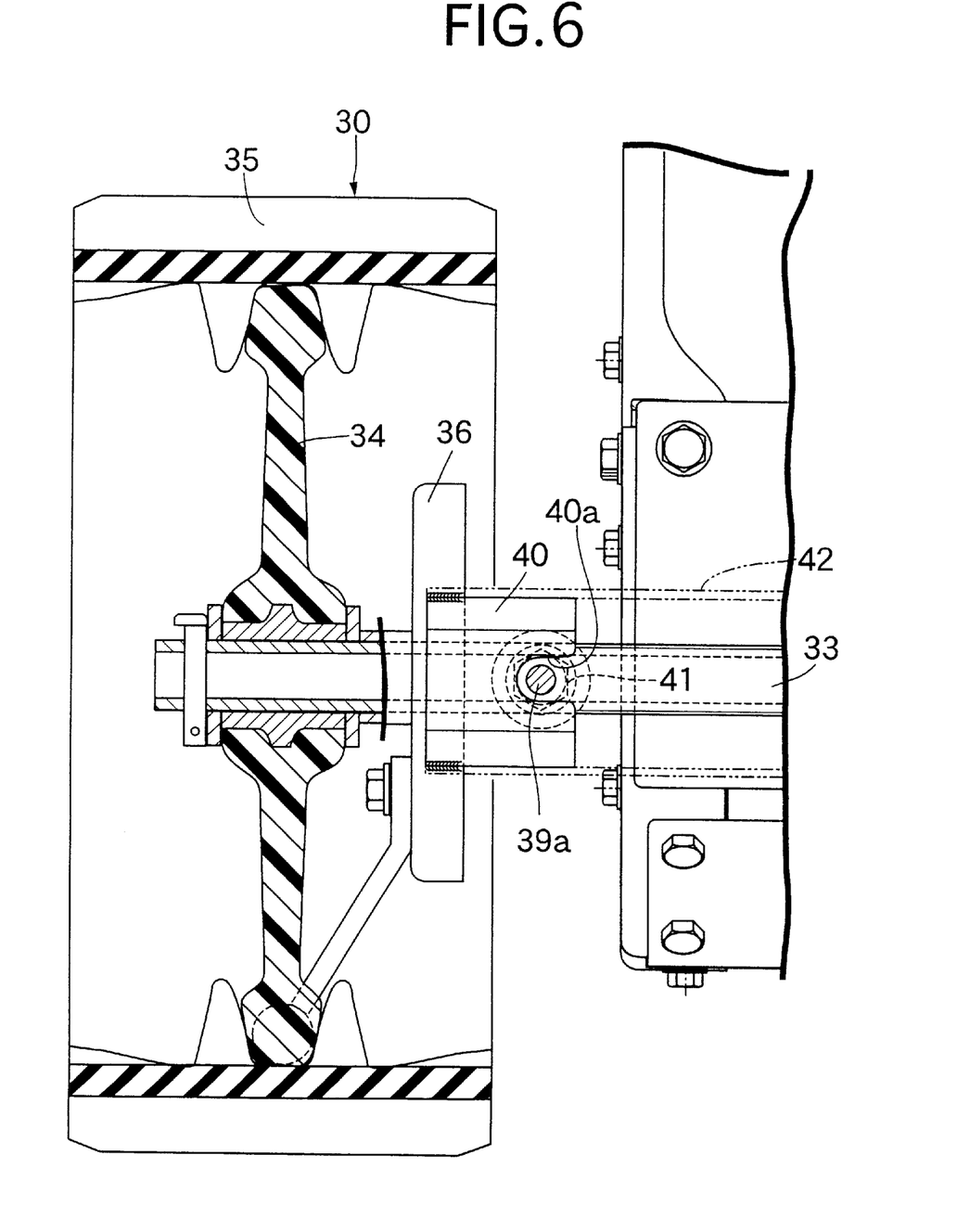
FIG. 6 is a sectional view taken along a line 6—6 in FIG. 5.

As shown in FIGS. 4 to 6, a drive section 30 is connected to and driven by the wheel driving shaft 21. The drive section 30 is comprised of a pair of left and right driven wheels 31, 31 connected to opposite ends of the wheel driving shaft 21 through connecting pins 32, 32, respectively, a rear axle 33 disposed at the rear of the machine frame 3, a pair of left and right follower wheels 34, 34 rotatably supported at opposite ends of the rear axle 33, a pair of left and right crawlers 35, 35 wound around the driving wheels 31, 31. The follower wheels 34, 34 are on laterally opposite sides, and a pair of left and right drive frames 36, 36 are disposed across the wheel driving shaft 21 and the rear axle 33 adjacent the insides of the driving wheels 31, 31. The follower wheels 34, 34 are on the laterally opposite sides. A bearing 37 is mounted at a front portion of each of the drive frames 36 to rotatably support the wheel driving shaft 21, and a longitudinal elongated bore 38 is provided in a rear portion of each of the drive frames 36 to extend through the rear axle 33.

A pair of crawler-regulating bolts 39, 39 are welded at their heads to the rear axle 33 adjacent the insides of the left and right drive frames 36, 36, and support plates 40, 40 are welded to rear ends of the drive frames, and each has a notch 40a through which a threaded shank 39a of each bolt 39 is passed. A pair of nuts 41, 41 are threadedly engaged with the threaded shank 39a of each of the regulating bolts 39 to clamp the support plate 40, 40 from the front and the rear, so that the degree of tension of the crawlers 35, 35 can be regulated by advancing or retracting the rear axle 33 toward or away from the drive frames 36, 36 by the advancement or retraction of the nuts 41, 41.

A channel-shaped cross member 42 is connected to the left and right support plates 40, 40 by utilizing the left and right crawler regulating bolts 39, 39 and the nuts 41, 41 and 41, 41. More specifically, the threaded shanks 39a of the crawler regulating bolts 39, 39 are passed through left and right opposite ends of the cross member 42, whereby the cross member 42 is fastened to the support plates 40, 40 by the front and rear nuts 41, 41 and 41, 41. A moderate flexural and torsional resiliency is provided to the left and right drive frames 36, 36 and the cross member 42, so that when one of the left and right crawlers 35 receives a push-up force from the road surface, the drive frame 36 on the same side as the one crawler 35 can be swung upwards about the wheel driving shaft 21 independently from the other drive frame 36.

The center of gravity G (see FIG. 1) of the machine body 2 lies to the rear of the wheel driving shaft 21 and hence, the machine body 2 generates a moment Ma intended to float the auger 24 around the wheel driving shaft 21 by its own weight. An expandable and contractible regulating mechanism 45 is mounted between the steering handlebar 6 and the cross member 42 for inhibiting the rotation of the machine body 2 about the wheel driving shaft 21 after the regulation of the level of the auger 24 against the moment Ma.

The expandable and contractible regulating mechanism 45 will be described below with reference to FIGS. 7A to 9.

Figure 7A:
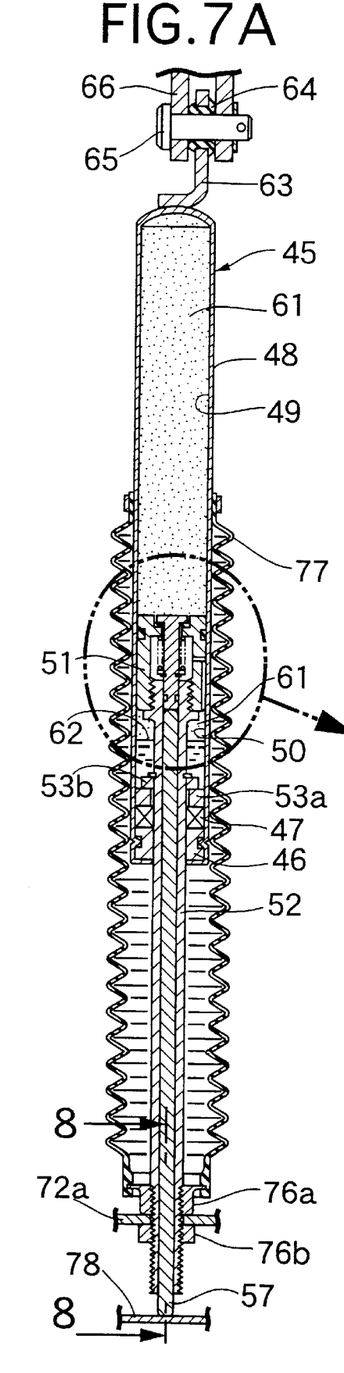
FIGS. 7A and 7B are sectional views taken along a line 7—7 in FIG. 1 and a partially enlarged view of FIG. 7A, respectively.

As shown in FIG. 7A, the expandable and contractible regulating mechanism 45 includes a cylinder 48 which is closed at one end thereof, with a slide bearing 46, an oil seal 47 and a stationary stopper 53a secured to the other end thereof. A hollow piston 51 is slidably received in the cylinder 48 and partitions the inside of the cylinder 48 into a first chamber 49 and a second chamber 50, and a hollow piston rod 52 is coupled to the piston 51 and passes through the second chamber 50 and is carried on the slide bearing 46. A movable stopper 53b is secured to the piston rod 52 for abutment against the stationary stopper 53a, to define a limit of expansion of the expandable and contractible regulating mechanism 45.

A valve seat 54 is provided at an upper open end of the internal hole of the hollow piston 51, and a mushroom on-off valve 55 is provided in an opposed relation to the valve seat 54 so as to be capable of seating on the valve seat. A valve spring 56 is mounted on the on-off valve 55 for biasing the on-off valve 55 in a seating direction. A push rod 52 is slidably disposed in the internal hole in the hollow piston rod 52 to abut against a lower end of the on-off valve 55, to open and close the on-off valve 55.

The piston 51 is provided with a lateral bore 58 permitting the internal hole in the piston 51 to communicate with an outer peripheral surface of the piston 51, and a longitudinal groove 59 permitting the lateral bore 58 to communicate with the second chamber 50. The lateral bore 58 and the longitudinal groove 59 form a communication passage 60 permitting communication between the first and second chambers 49 and 50. The communication passage 60 is opened and closed by the movement of the on-off valve 55 toward and away from the valve seat 54.

The expandable and contractible regulating mechanism 45 is disposed, so that the first chamber 49 is located above the second chamber 50. A highly pressurized gas 61 such as air, helium gas and the like are filled in the first and second chambers 49 and 50, and oil 62 is stored with its surface being in contact with the high-pressure gas 61, whereby the oil seal 47 and the slide bearing 46 are lubricated, and the leakage of the high-pressure gas 61 from the bearing is inhibited.

A mounting piece 63 having a rubber bush 64 fitted thereover is welded to an upper end of the cylinder 48, and an upper pivot 65 inserted through the rubber bush 64, is fixed at its opposite ends to a yoke 66 connected to the steering handlebar 6. In this manner, the cylinder 48 is oscillatably connected to the steering handlebar 6.

The piston rod 52 is connected at its lower end to a central portion of the cross member 42 in the following manner: A boss 70 having an axis turned longitudinally, is formed at the central portion of the cross member 42, and a first cylindrical lower pivot 73 secured to a first bracket 71 is rotatably fitted into the boss 70. A bolt 75 is threadedly fitted into the first lower pivot 73 for preventing removal of the first lower pivot 73. A second bracket 72 is swingably connected to the first bracket 71 through a second lower pivot 74 extending laterally. The second bracket 72 has a substantially horizontal mounting wall 72a, and the lower end of the piston rod 52 is passed through a central portion of the mounting wall 72. An external threaded portion is formed at the lower end of the piston rod 52, so that the piston rod 52 is secured to the second bracket 72 by clamping the mounting wall 72a, by a pair of upper and lower nuts 76a and 76b threadedly meshed with the threaded portion. Thus, the piston rod 52 is oscillatably connected to the cross member 42.

A bellows-shaped boot 77 is mounted between the upper nut 76a and the lower end of the cylinder 48 to cover an exposed portion of the piston rod 52.

An actuating lever 78 is mounted to abut against the lower end of the push rod 52 protruding from the piston rod 52, and is vertically turnably connected to the second bracket 72 through a pivot 79. The actuating lever 78 is biased downwards under the action of a return spring 80 comprising a torsion coil spring.

Referring again to FIGS. 1 to 3, an operating lever 81 is pinned at 82 on the steering handlebar 6 adjacent the underside of a right grip 6a and connected to the actuating lever 78 through an operating wire 83 comprising a Bowden cable. Thus, when the operating lever 81 is pulled up toward the right grip 6a to draw the operating wire 83, the actuating ever 78 can be turned upwards against the biasing force of the return spring 80 to urge the push rod 52, upwards to open the on-off valve 55.

Figure 7B:
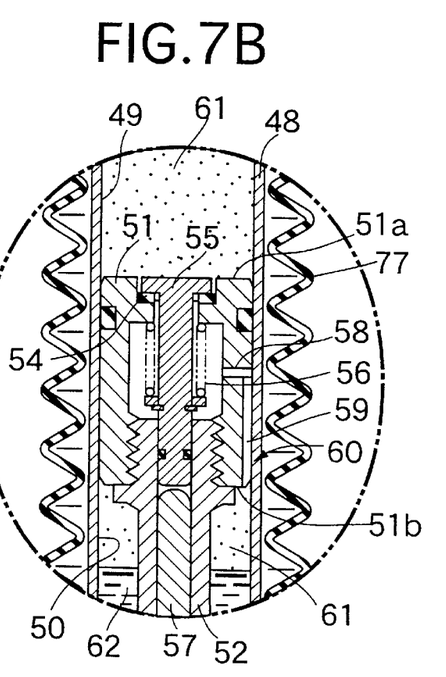
Figure 8:
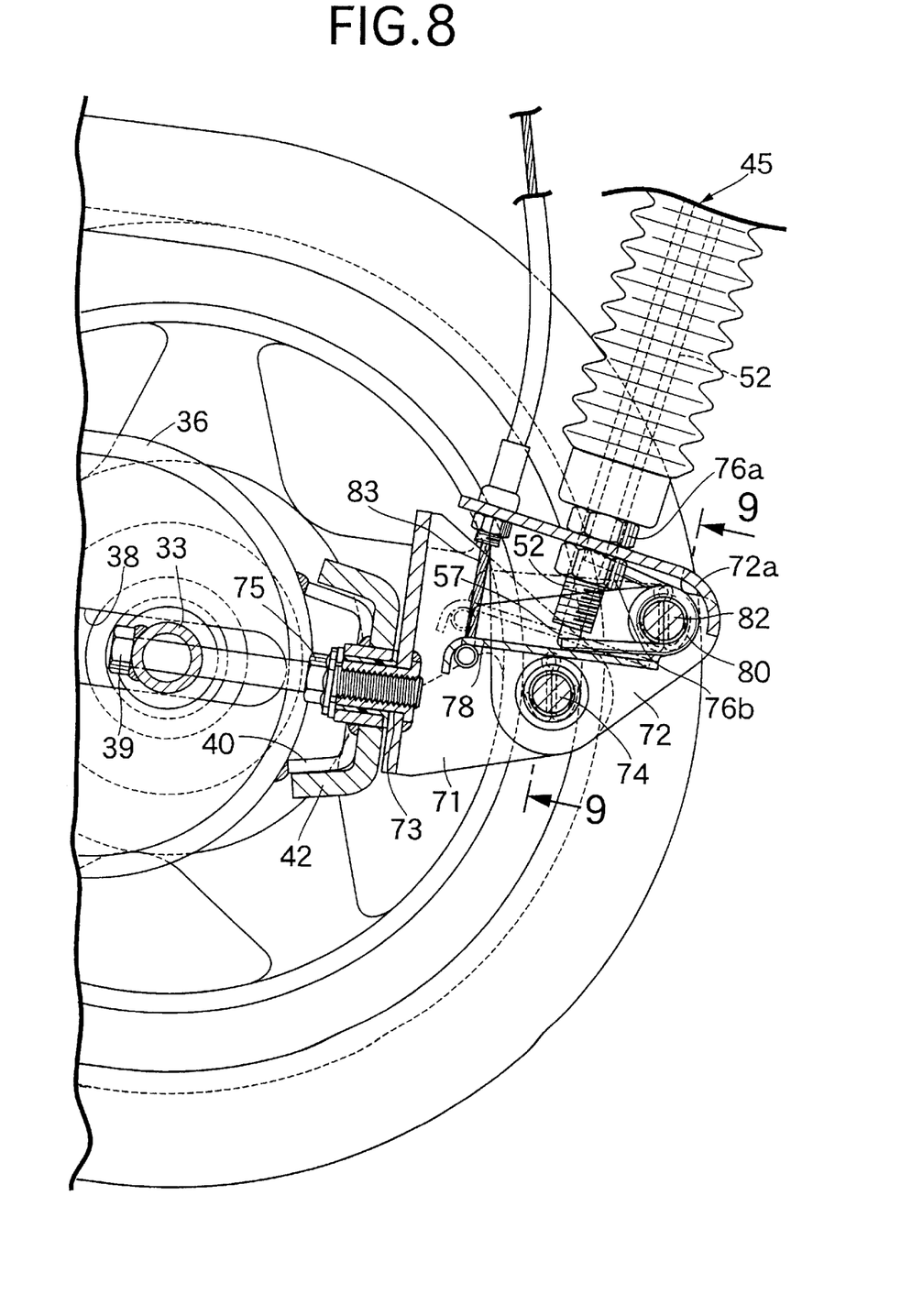
FIG. 8 is a sectional view taken along a line 8—8 in FIG. 7.
Figure 9:
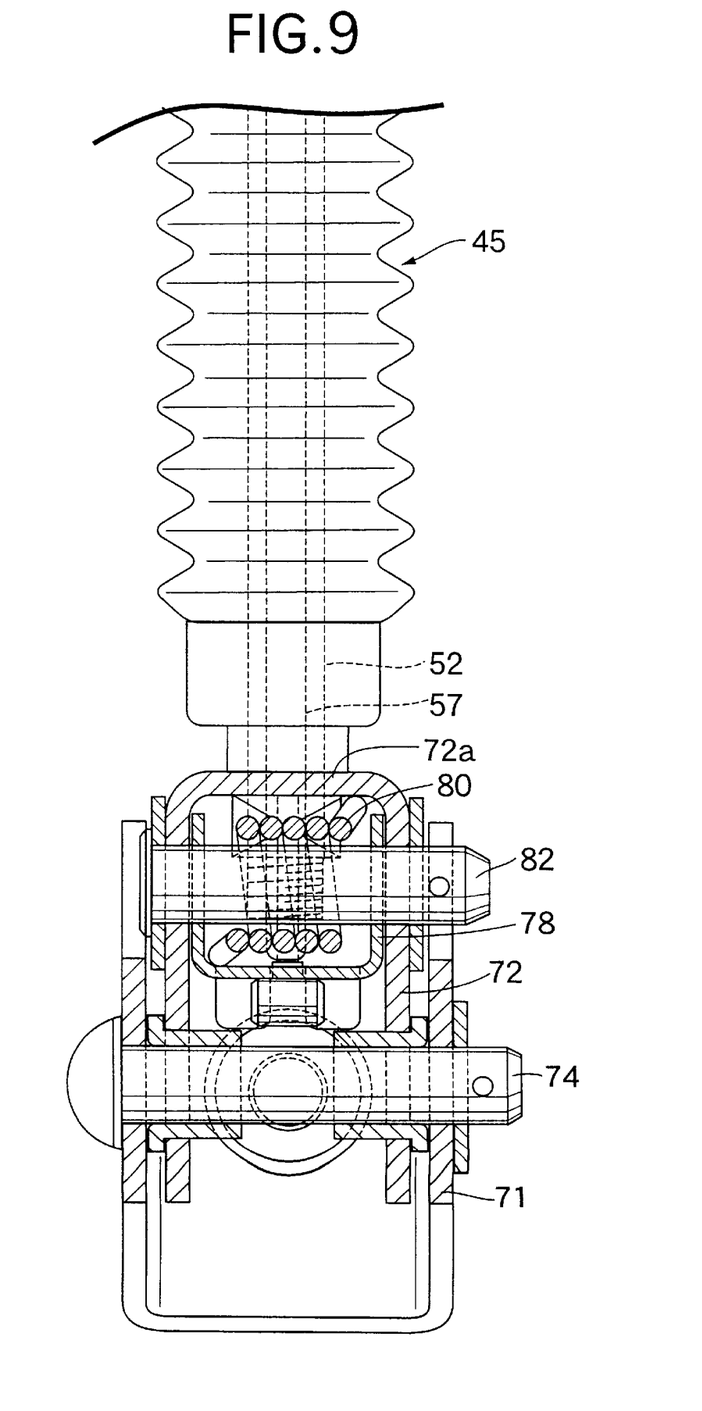
FIG. 9 is a sectional view taken along a line 9—9 in FIG. 3.

Referring to FIGS. 7A and 7B, a lower end face 51b (a second face end) of the piston 51 facing the second chamber 50 has a pressure receiving area smaller than that of an upper end face 51a (a first end face) facing the first chamber 49 by the cross sectional area of the piston rod 52 coupled to the piston 51, so that a difference is produced between thrusts provided by a pressure of the high-pressure gas 61 exerted to the end faces 51a and 51b. The difference between the thrusts causes an expanding force to be produced in the cylinder 48 and the piston rod 52, whereby the machine body 2 receives a moment Mb (see FIG. 1) around the wheel driving shaft 21 in a direction to lower the auger 24. This moment Mb is substantially balanced with the moment Ma provided by the weight of the machine body 2.

The operation of the first embodiment will be described below.

To regulate the level of the auger 24 of the snow-removing section 5, the operating lever 81 is first pulled up to open the on-off valve 55, so that the high-pressure gas 61 in the cylinder 48 can flow from one of the first and second chambers 49 and 50 to the other through the communication passage 60. As described above, the moment Mb provided around the wheel driving shaft 21 and received by the machine body 2 is substantially balanced with the moment Ma provided around the wheel driving shaft 21 by the weight of the machine body 2, due to the difference between the thrusts exerted on the upper end lower ends 51a and 51b of the piston 51 by the pressure of the high-pressure gas 61. Therefore, only by applying a small lifting and lowering force to the steering handlebar 6 by an operator, the high-pressure gas 61 can be allowed to flow between the first and second chambers 49 and 50 through the communication passage 60 to turn the machine body 2 about the wheel driving shaft 21, while expanding or contracting the cylinder 48 and the piston 52 relative to each other, thereby freely regulating the level of the auger 24.

To maintain the thus-regulated level of the auger 24, the operating force is released from the operating lever 81 so that the push rod 52 is lowered by the biasing force of the return spring 80, and the on-off valve 55 is closed by the biasing force of the valve spring 56, to block the communication passage 60. As a result, the expansion and contraction of the cylinder 48 and the piston rod 52 relative to each other caused by the flowing of the high-pressure gas 61 through the communication passage 60, are inhibited, whereby the level of the auger 24 is maintained constant.

The communication between the first and second chambers 49 and 50 is released in the above manner, but the high-pressure gas 61 in each of the chambers 49 and 50 is expandable and compressible. Therefore, when a vertical vibration is applied to the left and right crawlers 35, 35 during snow-removing operation, the cylinder 48 and the piston rod 52 are contacted moderately relative to each other, namely, exhibit a damper function to absorb the vibration, by the alternate repetition of the expansion and compression of the high-pressure gas 61 in the first and second chambers 49 and 50. Thus, it is possible to reduce the transmission of the vibration of the steering handlebar 6 to alleviate the fatigue of the operator.

The left and right drive frames 36, 36 can be vertically oscillated independently from each other about the wheel driving shaft 21 by the resilient deformation of the left and right drive frames 36, 36 and the cross member 42. Therefore, when one of the crawlers 35 receives a push-up force from a projection on the road surface, only the drive frame 36 on the same side as the one crawler 35 is swung upwards, and the shock of such swinging movement is absorbed by the damper function of the expandable and contractible regulating mechanism 45. Thus, the push-up force applied to the one crawler 35 cannot influence the other crawler 35 and the auger 24, and it is possible to stabilize the driving performance of the crawler 35 and the snow-removing performance of the snow-removing section.

In this case, the cylinder 48 and the piston rod 52 of the expandable and contractible regulating mechanism 45 are oscillatably connected to the steering handlebar 6 and the cross member 42, respectively and hence, during swinging movement of the cross member 42 attendant on the swinging movement of the one drive frame 36, it is possible to prevent a side thrust from being applied to the expandable and contractible regulating mechanism 45 by the oscillating actions of the cylinder 48 and the piston rod 52, thereby ensuring that the piston 51 and the piston rod 52 can be operated smoothly at all times and thus, a good damper function and a good durability can be ensured.

Moreover, since the expandable and contractible regulating mechanism 45 is provided with the damper function, a special damper device is not required, and the arrangement can be simplified.

In addition, the oil 62 is stored with its surface in contact with the high-pressure gas 61 in the bottom of the second chamber 50 and hence, the oil seal 47 and the slide bearing 46 can be lubricated by the oil to smooth the operation of the piston rod 52, and further, it is possible to effectively inhibit the leakage of the high-pressure gas 61 from the bearing 46. Therefore, the expanding function and the damper function of the expandable and contractible regulating mechanism 45 can be maintained over a long period.

Figure 10:
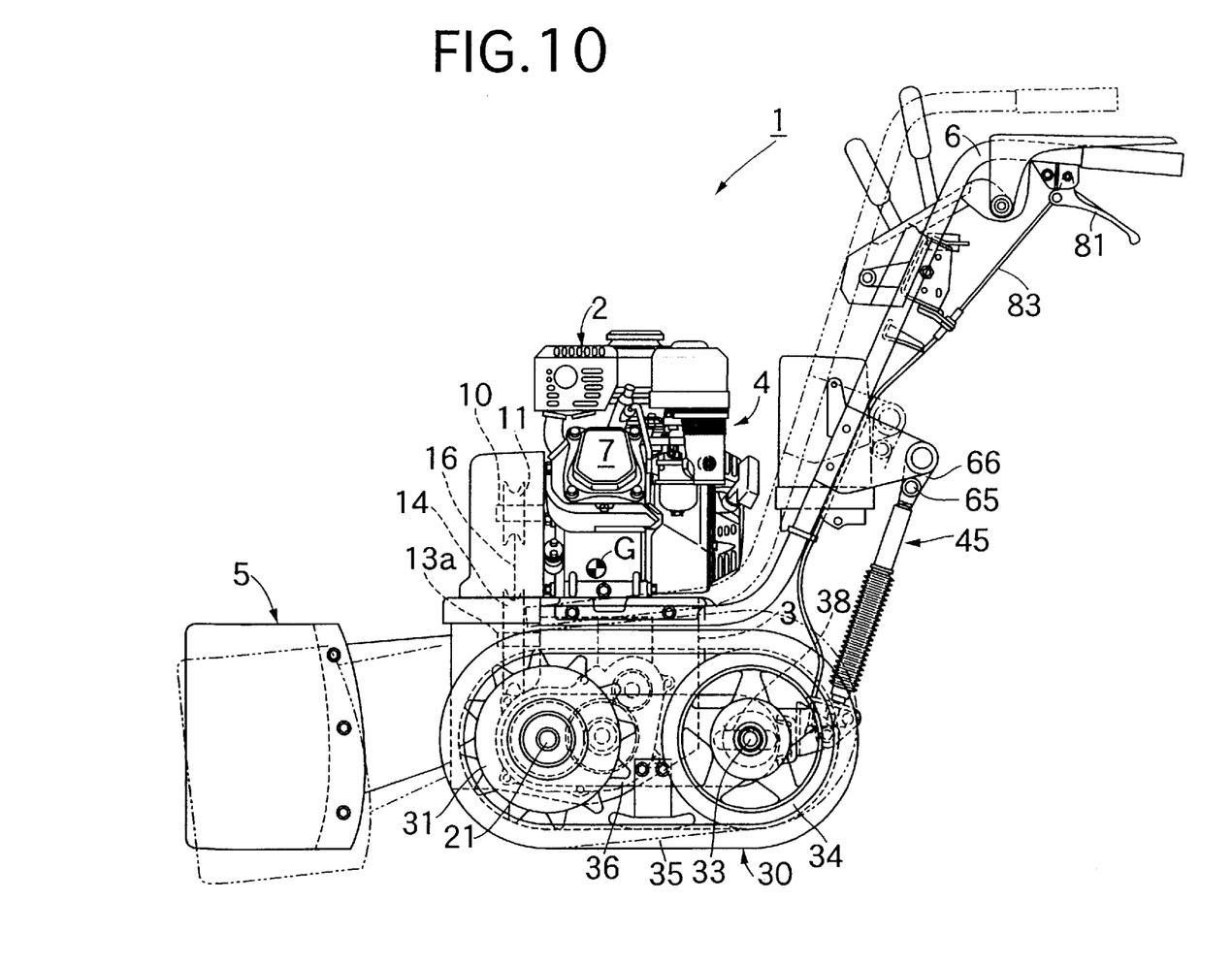
FIG. 10 is a side view of a dozer-type snow-removing machine according to a second embodiment of the present invention.

Finally, a second embodiment of the present invention will be described with reference to FIG. 10. In the second embodiment, a snow-removing section 5 is a dozer type, and the remaining structure is similar to that in the previous embodiment. Therefore, portions or components corresponding to those in the previous embodiment are designated by like reference characters, and the description of them is omitted.

For the purpose of ensuring the smooth independent swinging movements of the left and right drive frames 36, 36, the cross member 42 may be rotatably connected to the drive frames 36, 36 by a pivot.

Although the embodiments of the present invention have been described in detail, it will be understood that the present invention is not limited to the above-described embodiments, and various modifications in design may be made without departing from the spirit and scope of the invention defined in claims.

What is claimed is:

1. A snow-removing machine comprising a machine body having a snow-removing section mounted at a front portion thereof, a steering handlebar mounted at a rear portion thereof and a power unit mounted at an intermediate portion thereof; said power unit including a wheel driving shaft, a drive section having driven wheels driven by said wheel driving shaft of said power unit, said drive section being turnable relative to said machine body about said wheel driving shaft, and an expandable and contractible regulating mechanism coupled between said machine body and said drive section for regulating the level of said snow-removing section relative to said drive section, said expandable and contractible regulating mechanism comprising a cylinder connected to one of said machine body and said drive section, a piston slidably received in said cylinder for dividing the inside of said cylinder into a first chamber and a second chamber, a piston rod coupled to said piston, passing through said second chamber and connected to the other of said machine body and said drive section, a communication passage for permitting the communication between said first and second chambers, and an on-off valve for opening and closing said communication passage, wherein a first end face of said piston facing said first chamber is wider than a second end face of said piston facing said second chamber, and wherein a high-pressure gas is filled in said first and second chambers, such that the high-pressure gas flows through said communication passage upon opening of said on-off valve to enable the expansion and contraction of said cylinder and said piston rod relative to each other, and the flowing of the high-pressure gas through said communication passage is inhibited upon closing of said on-off valve, whereby the expansion and compression of the high-pressure gas in said first and second chambers is permitted.

2. A snow-removing machine according to claim 1, wherein the center of gravity of said machine body is located to the rear of said wheel driving shaft, and said expandable and contractible regulating mechanism is coupled between said machine body and said drive section at a position rearwardly of said wheel driving shaft, such that the moment around said wheel driving shaft due to the weight of said machine body is substantially balanced with a moment around said wheel driving shaft of said machine body due to the difference between thrusts exerted to said first and second end faces by said high-pressure gas.

3. A snow-removing machine according to claim 1 or 2, wherein said expandable and contractible regulating mechanism is positioned such that said second chamber is located below said first chamber, and wherein said cylinder includes a slide bearing and an oil seal at a lower end thereof, said piston rod slidably passing therethrough, and wherein oil stored in a bottom of said second chamber with the surface thereof being in contact with said high-pressure gas.

4. A snow-removing machine comprising a machine body having a snow-removing section mounted at a front portion thereof, a steering handlebar mounted at a rear portion thereof and a power unit mounted at an intermediate portion thereof; said power unit including a wheel driving shaft, a drive section having a pair of left and right driven wheels connected to opposite ends of said wheel driving shaft of said power unit, a pair of left and right drive frames relatively turnably connected to opposite ends of said wheel driving shaft and extending rearwards, a rear axle supported at the rear ends of said left and right drive frames, a pair of left and right follower wheels supported at opposite ends of said rear axle, and crawlers each reeved around said driven and follower wheels on the same side; and an expandable and contractible regulating mechanism coupled between said machine body and said drive section for regulating the level of said snow-removing section, a cross member, the rear ends of said pair of left and right drive frames being connected to each other by said cross member, such that the independent swinging movement of each of said drive frames is permitted about said wheel driving shaft, wherein the expandable and contractible regulating mechanism is coupled between said cross member and said machine body, and wherein said expandable and contractible regulating mechanism includes a cylinder filled with a high-pressure gas to provide a damper function to said expandable and contractible regulating mechanism.

5. A snow-removing machine according to claim 4, wherein said expandable and contractible regulating mechanism is oscillatably connected at the upper and lower opposite ends thereof to said machine body and said cross member, respectively.

* * * * *